E. F. NORELIUS.
TRAILER WAGON.
APPLICATION FILED NOV. 13, 1917.

1,329,307.

Patented Jan. 27, 1920.
4 SHEETS—SHEET 1.

WITNESSES:

INVENTOR
Emil F. Norelius
BY Strong & Townsend
ATTORNEYS

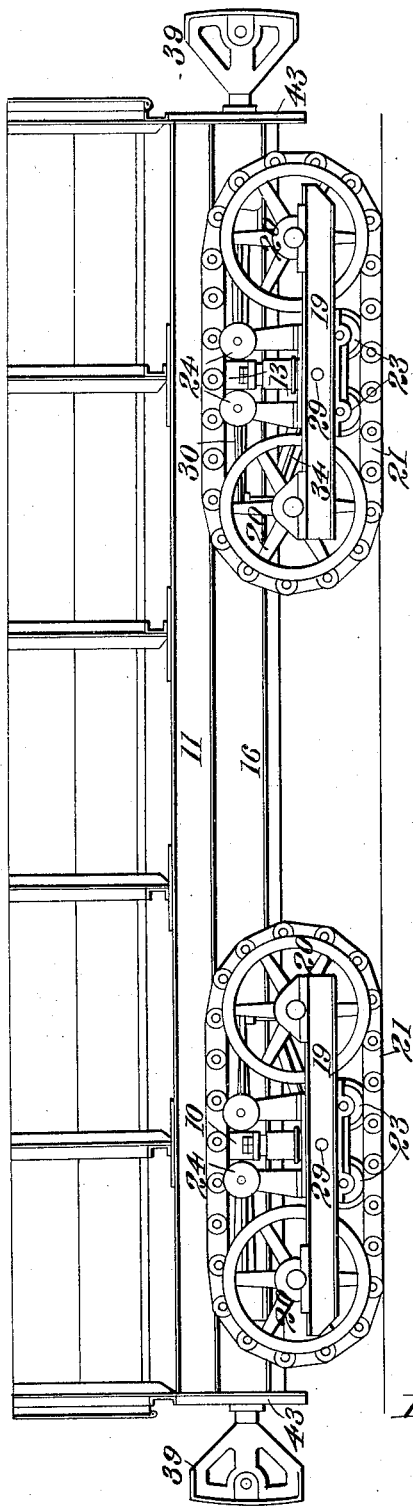

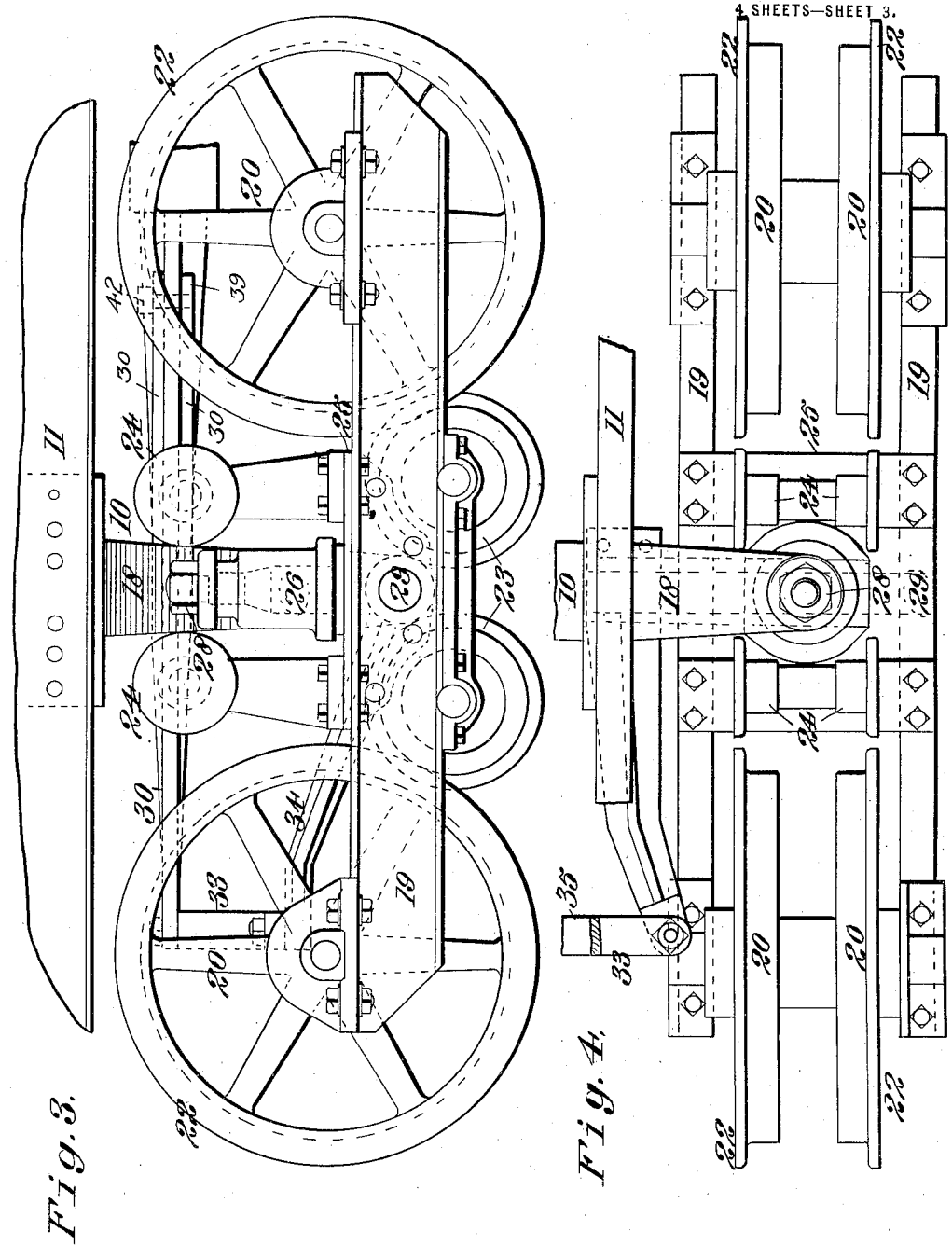

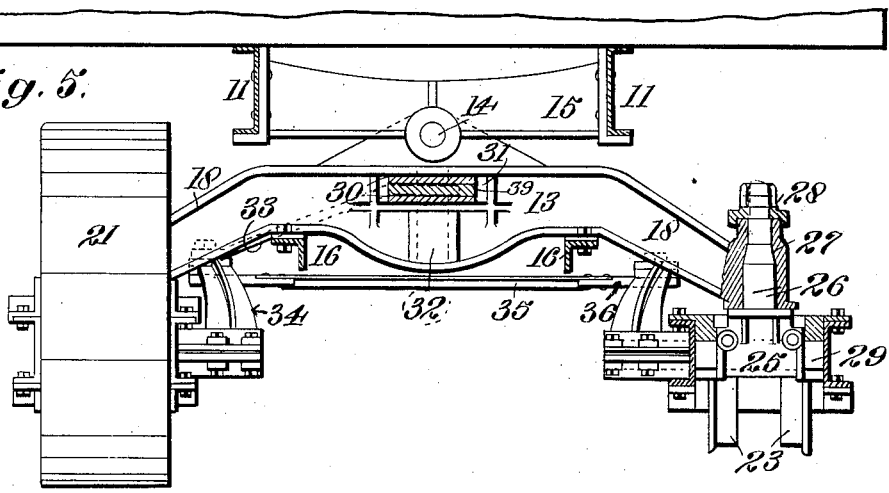

UNITED STATES PATENT OFFICE.

EMIL F. NORELIUS, OF PEORIA, ILLINOIS, ASSIGNOR TO THE HOLT MANUFACTURING COMPANY, OF STOCKTON, CALIFORNIA, A CORPORATION OF CALIFORNIA.

TRAILER-WAGON.

1,329,307.  Specification of Letters Patent.  Patented Jan. 27, 1920.

Application filed November 13, 1917. Serial No. 201,800.

*To all whom it may concern:*

Be it known that I, EMIL F. NORELIUS, a citizen of the United States, residing at Peoria, in the county of Peoria and State of Illinois, have invented new and useful Improvements in Trailer-Wagons, of which the following is a specification.

This invention relates to trailer wagons of the type shown and described in my prior application, Serial No. 864,252, filed September 30th, 1914.

The object of this invention is to provide a simplified and improved trailer wagon of large capacity in hauling very heavy loads under such conditions as are encountered in military operations, contracting, freighting, etc.

Generally stated the device comprises a wagon bed mounted on front and rear truck mechanism of the self-laying track type, which are connected so that the trucks will track in turning a corner. The parts are so arranged that the wagon may be drawn from either end and the units at opposite ends will steer and trail properly when operated either as a front or rear connection.

One form which my invention may assume is exemplified in the following description and illustrated in the accompanying drawings, in which—

Fig. 2 shows a side elevation of the trailer wagon complete.

Fig. 3 shows a side elevation of one of the truck units.

Fig. 4 shows a plan view of the same.

Fig. 5 shows an end elevation, partly in section, of the device.

Fig. 6 shows a plan view of one of the axles.

Fig. 7 shows a front elevation of the other axle.

Fig. 8 shows a plan view of the axle shown in Fig. 7.

Figure 1:
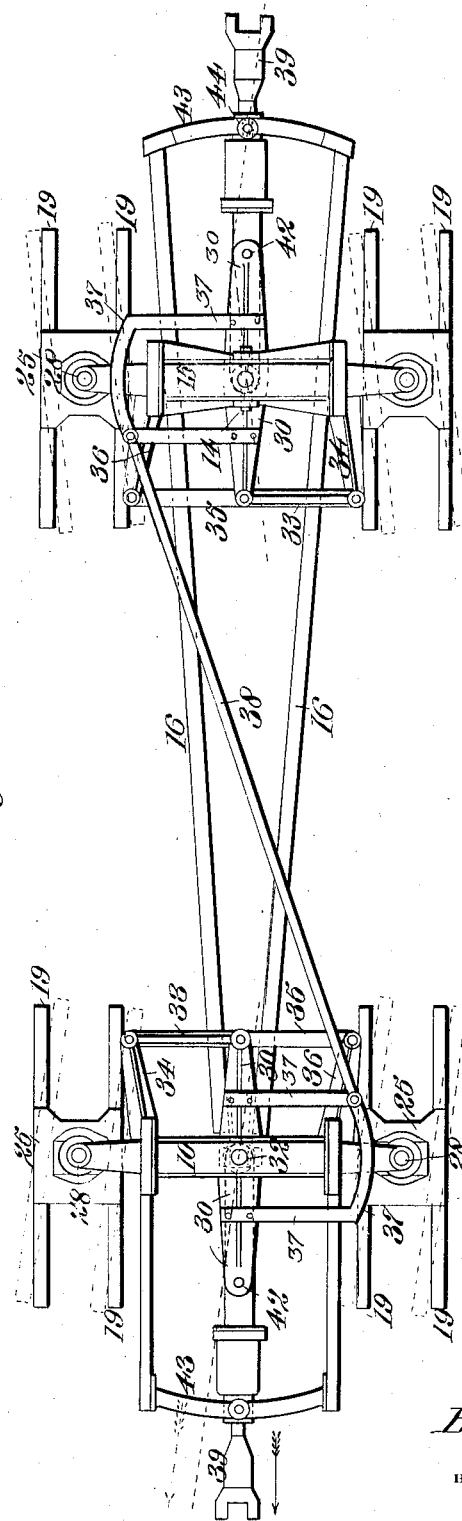
Figure 1 shows a plan view of the running gear of a wagon embodying my invention.

The axle 10 at one end of the wagon is riveted rigidly to the side frame bars 11 of the wagon bed by means of upstanding lugs 12. The axle 13 at the opposite end of the wagon has a central fore and aft extending pivotal connection 14 with a bolster 15, the latter being rigidly connected to the wagon bed. This arrangement provides a three-point support for the wagon bed and allows increased flexibility between the trucks and bed. The two axles are connected together by a V-shaped reach 16, which, at its apex, is connected to the axle 10 by means of a horizontal pivot 17 and has its legs connected rigidly to the axle 13 at separated points thereon.

Each axle has a goose-neck extension 18 at its ends to each of which a truck mechanism is swiveled. All truck mechanisms are alike and each comprises a pair of spaced frame bars 19 between which front and rear track carrying wheels 20 are journaled at the opposite ends. A track chain 21 is carried by said wheels 20, the track chain being of a widened construction and the carrying wheels being arranged in pairs spaced apart and having flanges 22 at their outer sides between which the track chain fits. Flanged truck rollers 23, also in pairs, are journaled beneath the frame bars 19 and operate upon the ground stretch of the track. Guide rollers 24 are carried above the frame bars to support the upper run of the track.

The swivel connection between each truck mechanism and the axle comprises a trunnion casting 25 fitting between the frame bars 19 and having a vertical pivot pin 26 entering a cone bearing 27 upon the end of the goose-neck extension and held therein by a screw cap 28, also horizontally extending pintles 29 on said casting journaled in said frame bars transversely thereof. Therefore the truck mechanism may swing laterally about the vertical pivot 26 whereby to turn and steer the vehicle and also rock vertically about the horizontal pintles 29 to permit the track to ride easily over obstructions and conform more or less to the contour of the ground.

For connecting opposite truck mechanism at each end whereby to steer the vehicle I employ a tiller bar 30 extending through a slot 31 in the central portion of the axle and pivoted thereto by means of a vertical pin 32. The inner end of the tiller bar is connected to a link 33 which extends to a steering arm 34 at one side, said steering arm being connected rigidly with the adjacent truck mechanism on a line with the vertical pivot 26. A connecting link 35 extends across from the arm 34 to the opposite side of the vehicle where it connects with a like arm 36 which steers the other truck mechanism.

In order to produce simultaneous turning of the pairs of the truck mechanism at opposite ends of the vehicle whereby to cause them to follow one in the track of the other I arrange an outrigger arm 37, preferably in the form of a bail, on each tiller bar. Said outrigger arms extend in opposite directions and are connected together by means of a diagonally extending link 38.

A series of these trailers are adapted to be coupled into a train and drawn along by a draft vehicle, such as a tractor. For this purpose I employ a draw bar 39 for each tiller bar connected at its inner end to the fulcrum pin 32. By means of a removable pin 42 passing through the outer end of the tiller bar and thence through the draw bar the two bars can be locked rigidly together. The outer end of the draw bar coöperates with an arcuate guide 43 rigid with the axle and is adapted to be locked thereto by means of a removable pin 44.

On account of the action of the diagonal link 38 the tendency in a train of vehicles when turning, in case the draw bars at the rear were held rigidly with the tiller bars and angled in the same direction as the rear trucks, would be to cause the succeeding trailers to worm or follow in an irregular course. Therefore, in operation, the draw bar at the front of the vehicle is disconnected from its guide bar 43 and locked rigidly with the tiller bar, whereas the rear draw bar is locked to its guide bar and allowed to flex with relation to the tiller bar, the pin 42 being removed. The effect will be as follows: When the front truck of the first vehicle is angled to the right for turning a corner, as shown in dotted lines in Fig. 1, the rear end of the rear draw bar remains in line with the longitudinal axis of the running gear, and thereby the front truck of the succeeding vehicle will not be affected except in so far as the longitudinal axis of the first or preceding vehicle changes its position relatively. Accordingly, when a series of these vehicles are drawn in a train, sharp turns may be made since the position of the rear draw bar is such as to cause the vehicle coupled therewith to follow in the tracks of the preceding vehicle.

Figure 9:
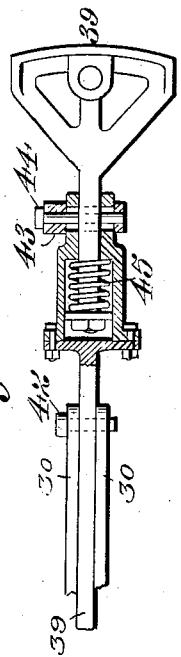
Fig. 9 shows a detail view of one of the draft bars.

The draw bars are preferably provided with cushioned heads 45, as shown in Fig. 9. The apertures in the draw bars which receive the pins 44 should be elongated in order to prevent locking of the draw bars when said pins are in place.

The connection between the truck mechanisms and the axle trees is such that round wheels may readily be substituted for the self-laying track members, merely by detaching the latter at the bearings 27 and applying knuckle jointed wheel spindles thereto.

By using self-laying track mechanism and having the front and rear units so connected as to track, the wagon bed can be made both longer and deeper than ordinarily and therefore fewer units are required to complete the train. Opposite truck members of each bar being disconnected except for the steering link 35 are free to rock in a vertical direction independently of each other.

Various changes in the construction and arrangement of the several parts herein shown and described may be employed without departing from the spirit of my invention as disclosed in the appended claims.

Having thus described my invention, what I claim and desire to secure by Letters Patent is:

1. A running gear for trailer wagons embodying fixed front and rear axles, truck units pivotally mounted on vertical axes at the ends of the axles to turn laterally for steering, a connection between the front and rear truck units to cause them to angle in opposite directions when traveling a curved course, a draw bar pivotally mounted at the rear end of the wagon for coupling a similar vehicle in train therewith, and detachable means for rigidly connecting said draw bar with the fixed axle and detachable means for connecting said draw bar with the truck units for turning on its pivotal center in unison with said units and controlling the position of the latter.

2. A running gear for trailer wagons embodying front and rear axles with means for maintaining said axles in parallel planes transversely of the vehicle, truck units pivotally mounted on vertical axes at the ends of the respective axles to turn laterally for steering a curved course, a connection between the front and rear truck units to cause them to angle in opposite directions when traveling a curved course, draw bars pivotally connected at their inner ends to the axles and projecting at opposite ends of the vehicle, independent detachable means for coupling said draw bars rigidly with the axles in line with the longitudinal axis of the vehicle and detachable means for coupling said draw-bars respectively with the truck units for controlling the angular position of the latter.

3. In a vehicle, front and rear axle trees, a wagon bed carried thereby and connected to one of said axle trees centrally thereof on a fore and aft extending pivot and connected to the other axle tree at separated points thereon, whereby a three-point support is formed for the bed, and a running gear embodying members connected with the first mentioned axle tree at separated points and with the last-mentioned axle tree by a fore and aft extending pivot, whereby the running gear and body are pivotally connected with the axle trees at opposite ends of the vehicle.

4. In a vehicle, the combination with front and rear axle trees, a running gear rigidly connected with one of said axle trees and pivotally connected with the other axle tree by a fore and aft extending pivot, a wagon bed rigidly connected with said axle tree to which the running gear is pivotally connected, and self-laying track mechanism associated with each end of each axle tree, for guiding and supporting the vehicle body and running gear.

5. In a trailer wagon, the combination with front and rear axle trees, a running gear rigidly connected with one of said axle trees and pivotally connected with the other of said axle trees on a fore and aft axis, of self-laying track units mounted on vertical axes at opposite ends of each axle tree, with connections between said track units whereby they are caused to angle in opposite directions in steering a curved course, draw bars pivotally connected with each axle tree and projecting at opposite ends of the vehicle, detachable connections for rigidly connecting the respective draw bars with their axles in substantially the longitudinal axis of the vehicle, and detachable connections for connecting the respective draw bars with the track-laying units at its end of the vehicle, whereby the draw bar at the rear end of the vehicle will be held rigidly with its axle and the draw bar at the front end of the vehicle connected with the track-laying units for controlling the angular position of the track-laying units at both ends of the vehicle.

6. In a trailer wagon, the combination with front and rear axle trees, with means for maintaining said axle trees in parallel transverse planes, self-laying track mechanism pivotally mounted on vertical axes at the ends of the respective axle trees, connections between said self-laying track mechanisms whereby they are caused to angle in opposite directions at opposite ends of the vehicle, said mechanism embodying a tiller bar pivotally mounted on each axle, a draw bar projecting at each end of the vehicle and pivotally connected with each axle, a segmental guide rigid with each axle and detachable connections for connecting the respective draw bars with either its tiller bar or segmental guide, whereby either of said draw bars may be rigidly connected with its axle and held in substantially the longitudinal axis of the vehicle, and the other of said draw bars may be connected with its tiller bar for controlling the angular position of the self-laying track mechanism at opposite ends of the vehicle.

7. In a vehicle, front and rear axle trees each having downwardly extending end portions and vertically disposed conical bearings on the ends of each axle and a self-laying track truck mechanism for each end of each axle tree connected thereto by a vertically extending pivot pin fitting into the adjacent bearing.

8. In a vehicle, front and rear axle trees formed at each end with a vertically disposed conical bearing, a self-laying track truck mechanism for each end of each axle, a trunnion casting pivotally mounted on each truck mechanism on horizontally disposed pintles extending transversely of the truck mechanism and a vertically extending pivot pin on each casting fitting into the bearing on the adjacent end of the axle tree.

9. In a vehicle, front and rear axle trees formed at each end with a vertically disposed conical bearing, a self-laying track truck mechanism for each end of each axle, a trunnion casting pivotally mounted on each truck mechanism on horizontally disposed pintles extending transversely of the truck mechanism, a vertically extending pivot pin on each casting fitting into the bearing on the adjacent end of the axle tree and steering mechanism for turning the truck mechanisms about their vertically disposed pivots.

10. In a trailer wagon, front and rear axle trees, an endless flexible self-laying track mechanism pivotally mounted on each end of each axle tree for turning movement in a lateral direction, each truck mechanism comprising a pair of fore and aft extending spaced frame bars, carrying wheels at each end of the frame bars arranged in pairs spaced apart with flanges on the opposite sides between which the track fits and truck rollers journaled on the intermediate portion of the frame bars and operating upon the ground stretch of the track.

In testimony whereof I have hereunto set my hand in the presence of two subscribing witnesses.

EMIL F. NORELIUS.

Witnesses:
ROBERT W. GOTSHALL,
WILLIAM TURNBULL.